(12) United States Patent
Hunold et al.

(10) Patent No.: US 11,400,804 B2
(45) Date of Patent: Aug. 2, 2022

(54) TRANSMISSION ARRANGEMENT FOR A VEHICLE HYBRID DRIVE

(71) Applicant: ZF Friedrichshafen AG, Friedrichshafen (DE)

(72) Inventors: Bernard Hunold, Friedrichshafen (DE); Michael Preuss, Friedrichshafen (DE); Johannes Glueckler, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/169,999

(22) Filed: Feb. 8, 2021

(65) Prior Publication Data

US 2021/0268890 A1    Sep. 2, 2021

(30) Foreign Application Priority Data

Mar. 2, 2020    (DE) .................. 10 2020 202 664.5

(51) Int. Cl.
| | |
|---|---|
| *B60K 6/547* | (2007.10) |
| *B60K 6/365* | (2007.10) |
| *B60K 17/28* | (2006.01) |
| *F16H 37/04* | (2006.01) |
| *B60K 17/08* | (2006.01) |

(52) U.S. Cl.
CPC ............. *B60K 6/547* (2013.01); *B60K 6/365* (2013.01); *B60K 17/08* (2013.01); *B60K 17/28* (2013.01); *F16H 37/046* (2013.01); *B60Y 2200/92* (2013.01); *B60Y 2400/46* (2013.01); *F16H 2702/02* (2013.01)

(58) Field of Classification Search
None
See application file for complete search history.

(56) References Cited

U.S. PATENT DOCUMENTS

| | | | | |
|---|---|---|---|---|
| 5,337,848 | A | * | 8/1994 | Bader ............. F16H 3/0915 180/65.25 |
| 6,006,620 | A | * | 12/1999 | Lawrie ............. B60W 10/06 74/335 |

(Continued)

FOREIGN PATENT DOCUMENTS

| | | |
|---|---|---|
| DE | 199 39 814 A1 | 2/2001 |
| DE | 199 81 968 B4 | 7/2012 |

(Continued)

OTHER PUBLICATIONS

German Search Report Corresponding to 10 2020 202 664.5 dated Dec. 10, 2020.

*Primary Examiner* — Dirk Wright
(74) *Attorney, Agent, or Firm* — Finch & Maloney PLLC; Michael J. Bujold; Jay S. Franklin

(57) ABSTRACT

A transmission arrangement for a hybrid drive of a motor vehicle, in particular a utility vehicle. The transmission arrangement has a change-speed transmission (1), in particular a group transmission (1) with a drive output side (1*b*), a drive output flange (2) and a countershaft (VW). An add-on transmission (3) is arranged on the change-speed transmission (1) and has at least one electric machine (EM) and at least one gear ratio step (Ü1). The at least one electric machine (EM) is connected to the countershaft (VW) by way of the at least one gear ratio step (Ü1) and can be engaged as an additional electric drive.

13 Claims, 4 Drawing Sheets

(56) References Cited

U.S. PATENT DOCUMENTS

| | | | | |
|---|---|---|---|---|
| 6,307,276 | B1* | 10/2001 | Bader | B60W 50/0097 290/40 C |
| 6,506,139 | B2 | 1/2003 | Hirt et al. | |
| 6,634,247 | B2* | 10/2003 | Pels | B60W 10/02 74/329 |
| 8,050,830 | B2* | 11/2011 | Komeda | B60W 10/10 701/51 |
| 8,257,221 | B2* | 9/2012 | Leufgen | F16H 3/006 477/3 |
| 8,727,939 | B2* | 5/2014 | Chen | B60W 10/02 477/5 |
| 8,931,371 | B2* | 1/2015 | Xie | B60K 6/547 74/665 A |
| 9,341,239 | B2* | 5/2016 | Lee | F16H 3/08 |
| 9,358,868 | B2* | 6/2016 | Wenzel | B60K 6/36 |
| 9,545,840 | B2* | 1/2017 | Zhu | B60K 6/48 |
| 10,814,714 | B2* | 10/2020 | Hummel | F16H 3/089 |

FOREIGN PATENT DOCUMENTS

| | | |
|---|---|---|
| DE | 10 2013 223 462 A1 | 5/2015 |
| DE | 10 2015 224 208 B3 | 5/2017 |
| DE | 10 2016 218 361 A1 | 3/2018 |
| WO | 2016/046001 A1 | 3/2016 |

\* cited by examiner

TRANSMISSION ARRANGEMENT FOR A VEHICLE HYBRID DRIVE

This application claims priority from German patent application Ser. No. 10 2020 202 664.5 filed Mar. 2, 2020.

FIELD OF THE INVENTION

The invention relates to a transmission arrangement for a hybrid drive of a motor vehicle, in particular a utility vehicle, comprising a change-speed transmission, in particular a group transmission with a drive output side, a drive output flange and at least one countershaft.

BACKGROUND OF THE INVENTION

From DE 10 2016 218 361 A1 a hybridized motor vehicle transmission has become known, which is in the form of a group transmission that has a main group and a range group and which has on its input or drive input side an electric machine that can be coupled to the main group of the group transmission by means of a planetary gearset. The electric machine and the planetary gearset are arranged coaxially with the input shaft of the main group. The main group has two countershafts, each with five fixed wheels which mesh with loose wheels on the input shaft. The range group, arranged on the drive output side, is in the form of a planetary gear system.

SUMMARY OF THE INVENTION

Starting from a conventional drive with an internal combustion engine and a multi-gear transmission, a purpose of the present invention is to upgrade the conventional drive to a hybrid drive.

The invention embodies the features specified in the independent claim(s). Advantageous design features emerge from the subordinate claims.

According to the invention it is provided that on a known change-speed transmission, in particular a group transmission for utility vehicles, an add-on transmission with at least one electric machine and at least one gear ratio step is arranged, wherein the at least one electric machine is connected by way of the at least one gear ratio step to the countershaft of the change-speed transmission and can be engaged as an additional electric drive. This gives the advantage that a conventional drive of a motor vehicle with an internal combustion engine can be upgraded to a hybrid drive by the subsequent or optional addition of a hybrid module. The electric machine is preferably designed to operate below the low-voltage limit (48 volts), and is therefore inexpensive. To the existing utility vehicle transmission only a few modifications have to be carried out for the add-on transmission with the electric machine(s), i.e. the hybrid module, to be able to be installed on the change-speed transmission. If necessary, if a hybrid drive is no longer needed, the hybrid module can be taken off again.

According to a preferred embodiment, the hybrid module is arranged on the rear or drive output side of the transmission next to the drive output flange. Advantageously, in its relevant motor/output-flange length the transmission is not made longer by installation parallel to the cardan shaft, or only as little as possible.

According to a further preferred embodiment, in the power flow between the at least one electric machine and the countershaft there is arranged at least one shifting clutch, preferably a claw clutch, by means of which the electrical drive can be connected or decoupled. By way of a gear ratio stage the electric machine drives the countershaft, from which the power flows to the transmission output shaft. Thus, the power of the internal combustion engine and the power of the electric machine are available at the drive output flange. However, it is also possible to switch off the internal combustion engine and drive purely electrically. Furthermore, electrical energy for operating auxiliary aggregates or for storage can be obtained from the kinetic energy of the vehicle or the internal combustion engine.

In a further preferred embodiment two electric machines are fixed on the add-on transmission, wherein on the one hand an axis-parallel arrangement or on the other hand a coaxial arrangement on opposite sides of the add-on transmission are possible. The different arrangements of the electric machines also depend on the incorporation options in the motor vehicle. The larger electrical energy quantity available reduces the fuel consumption more markedly and allows the internal combustion engine to be switched off and re-started while driving.

In a further preferred embodiment an auxiliary transmission with a first or a second planetary gearset, each comprising a sun shaft, a ring gear shaft and a carrier shaft, is associated with the electric machine. This gives the advantage that the drive input and the drive output of the planetary gearset can be arranged coaxially and on the same side, namely the side of the auxiliary transmission adjacent to the add-on transmission. With the gear ratio of the planetary gearset of the auxiliary transmission, the switched-off internal combustion engine can be restarted by an electric machine.

According to a further preferred embodiment the first planetary gearset is shiftable, such that a first gear can be engaged by holding the ring gear shaft still, and a second gear by blocking the sun shaft with the ring gear shaft. Blocking means that the sun shaft and the ring gear shaft are coupled to one another and rotate as a block. This provides on the one hand a gear ratio in the slow range and on the other hand a direct drive (gear ratio 1:1). During block operation the electric machine is operated without additional losses in the planetary transmission in the best efficiency range, while for the very short motor restarting time the additional gear ratio of the planetary transmission is activated.

In a further preferred embodiment, for restarting the internal combustion engine the planetary gearset of the auxiliary transmission has a freewheel and only one gear ratio with only one shift position. This reduces the actuation complexity. In this case the sun shaft is driven by the electric machine, while the ring gear shaft drives a gearwheel of the gear ratio step; the carrier shaft is blocked by a freewheel when the electric machine starts the internal combustion engine, so that the electric machine runs in reverse, i.e. in the rotational direction opposite to its direction during hybrid operation.

According to a further preferred embodiment, a refrigerant compressor of an air-conditioning unit on board the motor vehicle is associated with the add-on transmission. In this case the compressor is driven by a further gear ratio step of the add-on transmission. By decoupling the hybrid module from the countershaft, air-conditioning can take place while stationary thanks to the electric machine. While driving, the energy can optionally be drawn from the vehicle or from the internal combustion engine.

In a further preferred embodiment the gear ratio steps of the add-on transmission are in the form of spur gear stages, preferably with the spur gears arranged in one plane. In that way, viewed in an axial direction of the change-speed transmission a narrow add-on transmission is obtained, whose housing serves to support the at least one electric machine, the auxiliary transmission, the compressor and optionally other auxiliary aggregates too.

BRIEF DESCRIPTION OF THE DRAWINGS

Example embodiments of the invention are illustrated in the drawing and will be described in greater detail below, so that further features and/or advantages may emerge from the description and/or the drawing, which shows.

DETAILED DESCRIPTION OF THE PREFERRED EMBODIMENTS

Figure 1:
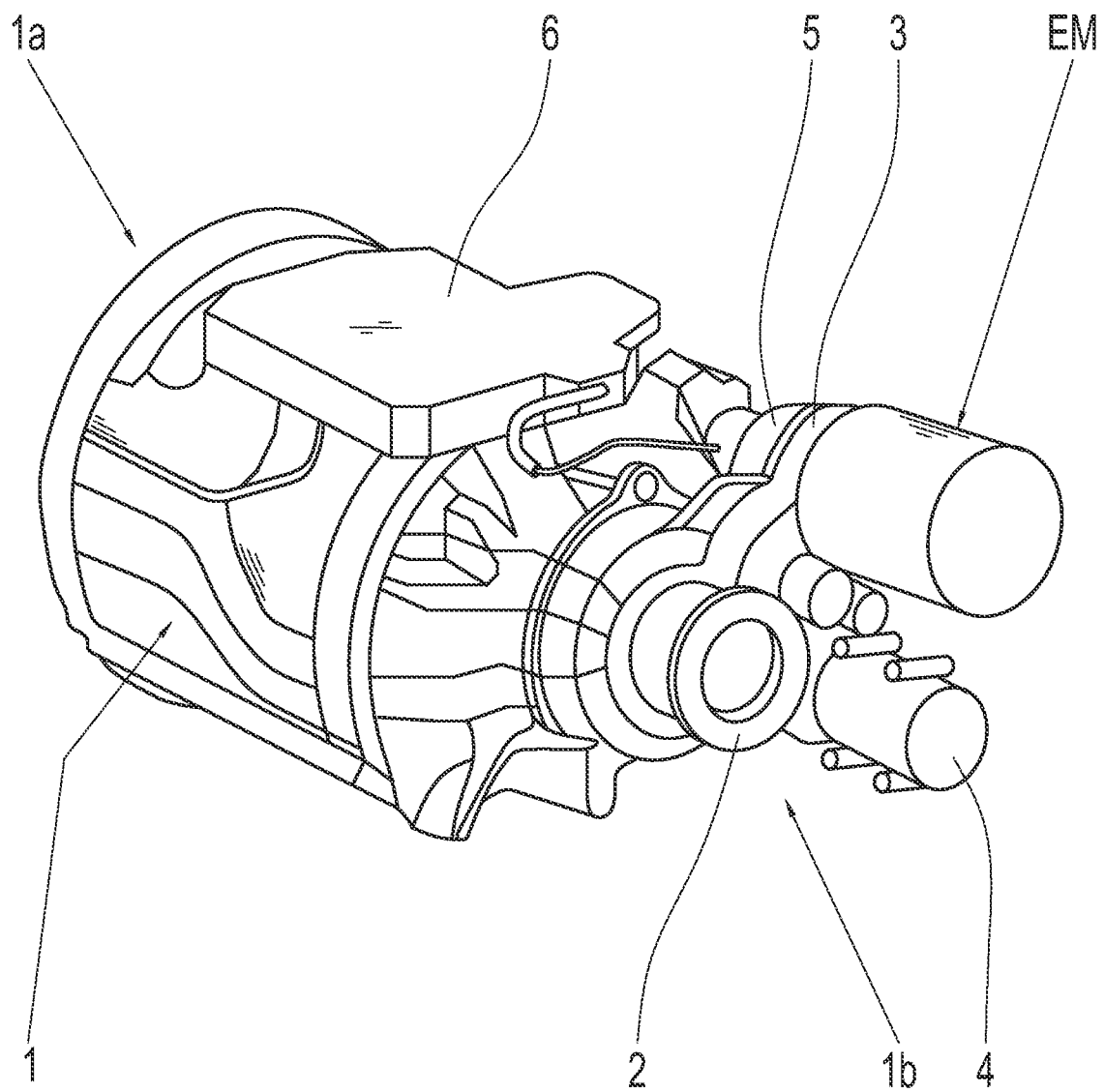
FIG. 1: a 3-D representation of a utility vehicle transmission with an add-on transmission according to the invention, an electric machine and an air-conditioner compressor, arranged on the drive output side of the transmission.

FIG. 1 shows a change-speed transmission 1 for utility vehicles, with a front side or drive input side 1*a* and a rear side or drive output side 1*b*, represented in 3D viewed from the drive output side 1*b*. The change-speed transmission 1, preferably used for utility vehicles, corresponds to the known prior art and has on its drive output side 1*b* a drive output flange 2. According to the invention, on the rear side 1*b* there is arranged an add-on transmission 3, onto which an electric machine EM, a compressor 4 of an air-conditioning unit, also called a refrigerant compressor 4, and an auxiliary transmission 5 are fixed. The add-on transmission 3 with the electric machine EM, the compressor 4 and the auxiliary transmission 5, forms a hybrid module arranged to the side of the drive output flange 2. To the top side of the housing of the change-speed transmission 1 is fixed a transmission control device 6, about which more will be said later.

Figure 2:
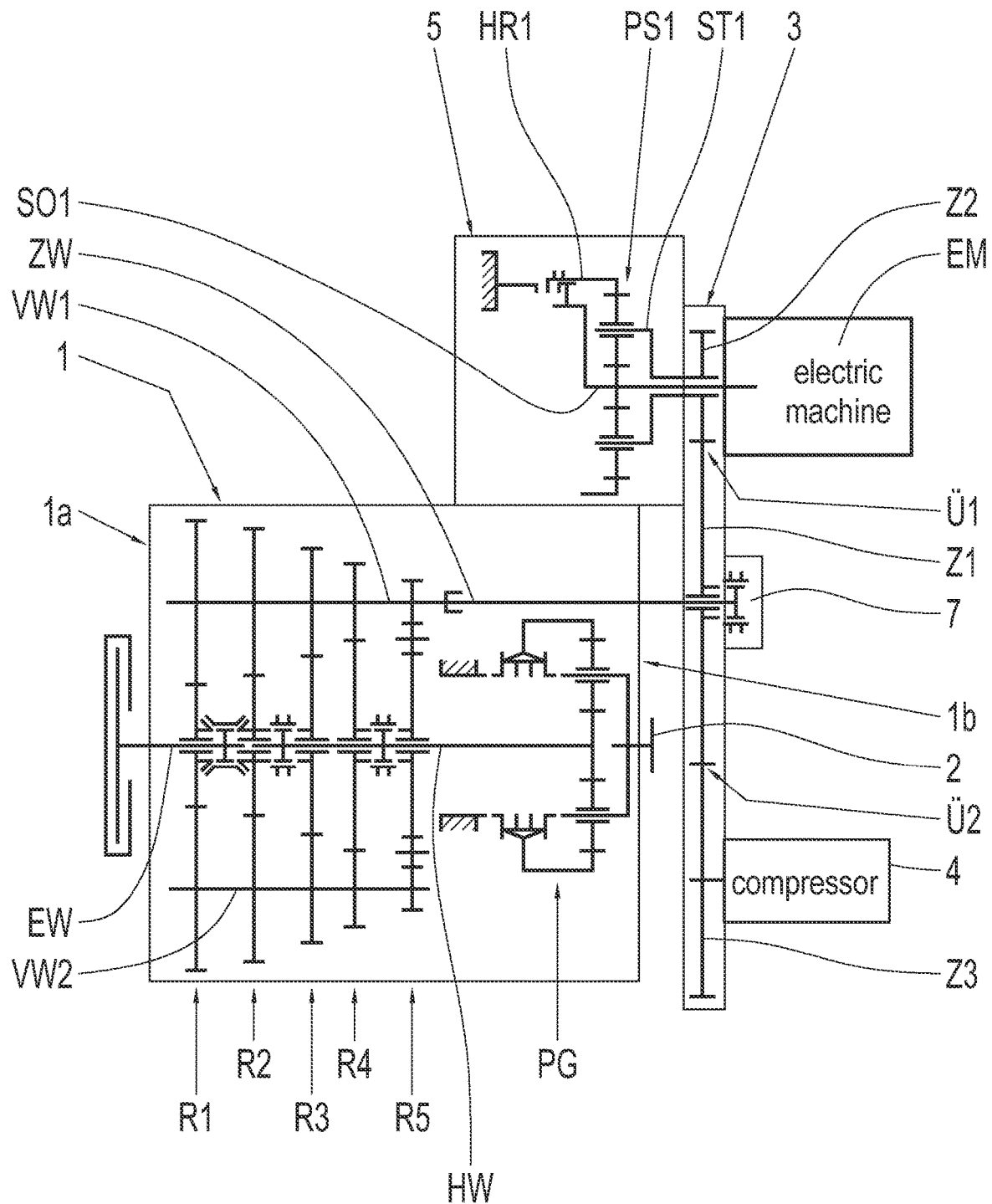
FIG. 2: a schematic representation of the utility vehicle transmission with the add-on transmission, an electric machine, an auxiliary transmission and an air-conditioner compressor.

FIG. 2 shows a schematic representation of the change-speed transmission 1 with the add-on transmission 3, the electric machine EM, the compressor 4 and the auxiliary transmission 5 according to FIG. 1. The same indexes are used for the same components. The change-speed transmission 1 is in the form of a group transmission and has five wheel planes R1, R2, R3, R4 and R5, wherein the wheel planes R1 and R2 form a splitter group and the wheel planes R3, R4 and R5 form a main group; a shiftable planetary transmission PG forms a range group. Thus, twelve gears can be engaged. The change-speed transmission 1 has an input shaft EW, a main shaft HW and two countershafts VW1, VW2. The first countershaft VW1 is coupled to an intermediate shaft ZW, which in the prior art serves to drive an auxiliary aggregate and is also known as a PTO (Power Take-Off). In the present case, relative to the first countershaft VW1 the intermediate shaft ZW serves as a connecting shaft to the add-on transmission 3. The add-on transmission 3 comprises three gearwheels arranged in one plane, a first gearwheel Z1 on the axis of the countershaft VW1, a second gearwheel Z2 on the axis of the electric machine EM and a third gearwheel Z3 on the axis of the compressor 4. The gearwheels Z1 and Z2 form a first gear ratio step Ü1 between the electric machine EM and the countershaft VW1, and the gearwheels Z1 and Z3 form a second gear ratio step Ü2 between the compressor 4 and the countershaft VW1. The first gearwheel Z1 is arranged rotatably ("loose") on the intermediate shaft ZW and can be coupled to the intermediate shaft ZW by means of a shifting clutch 7, in particular a claw clutch 7. The auxiliary transmission 5 comprises a first planetary gearset PS1, also called a planetary set PS1 for short, which is arranged coaxially with the rotational axis of the electric machine EM. The rotor shaft of the electric machine EM drives the sun shaft SO1 of the first planetary gearset PS1, while the drive output of the first planetary gearset PS1 takes place via the carrier shaft ST1 to the second gearwheel Z2. The first planetary gearset PS1 can be shifted, so that a first gear can be engaged by holding the ring gear shaft HR1 still and a second gear by blocking the sun shaft SO1 with the ring gear shaft HR1.

The function of the above-described hybrid module, which comprises at least the add-on transmission 3 and an electric machine EM and optionally the auxiliary transmission 5, is to provide an additional electric drive for the conventional drive of a utility vehicle, i.e. an internal combustion engine with the change-speed transmission 1; in other words: the conventional internal combustion engine drive should be upgraded and retrofitted to become a hybrid drive, i.e. hybridized. The power flow from the electric machine EM into the change-speed transmission 1 takes place by way of the intermediate shaft ZW and the first countershaft VW1. During electric additional driving by the electric machine EM (hybrid drive), the first planetary gearset PS1 is blocked, i.e. between the rotor or sun shaft SO1 and the carrier shaft ST1 there is a gear ratio of 1:1. The carrier shaft ST1 drives the second gearwheel Z2, which meshes with the first gearwheel Z1 and forms the first gear ratio step Ü1 (in the slow range). The gear ratio is adapted to the vehicle speed range in which driving most often takes place, so that in this range the electric machine EM can be operated with its best efficiency. During electric driving the shifting clutch 7 in the change-speed transmission 1 is engaged. At the same time, the compressor 4 is driven with the second gear ratio Ü2. Thus, during hybrid operation the sum of the powers of the internal combustion engine and the electric machine EM is delivered to the drive output flange 2.

When not in hybrid operation, i.e. with the internal combustion engine switched off, the electric machine EM can also be used in combination with the auxiliary transmission 5 as the starter motor or starter for the internal combustion engine. For this, the ring gear HR1 of the first planetary gearset PS1 is braked, so that between the sun shaft SO1 driven by the electric machine EM and the driven carrier shaft ST1 a gear ratio in the slow range is obtained. At the input shaft EW of the transmission 1 there is then a sufficiently high torque for restarting the internal combustion engine.

Figure 3:
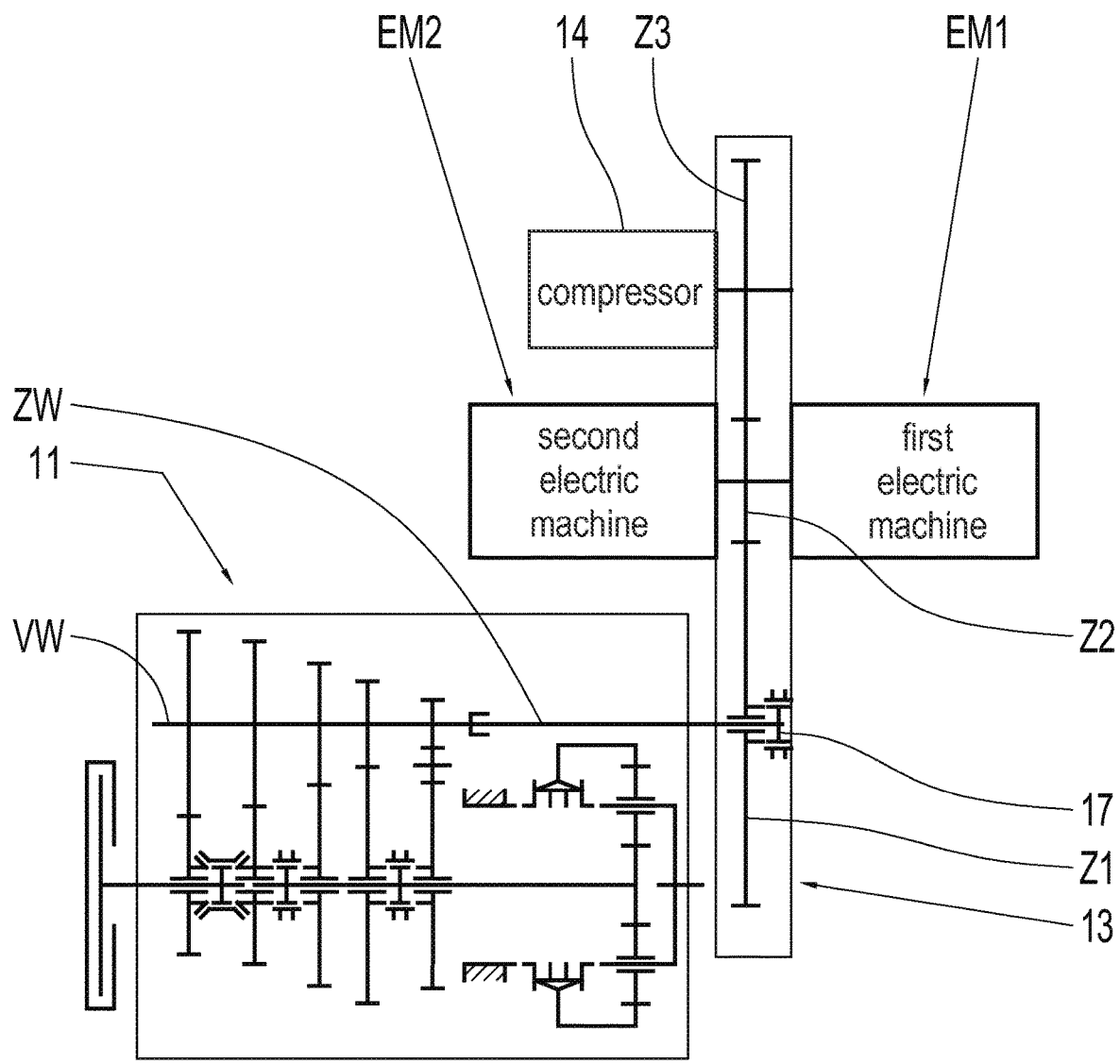
FIG. 3: a further example embodiment of the invention, with two electric machines arranged coaxially and diametrically opposite one another on the add-on transmission.

FIG. 3 shows another embodiment of the invention for a hybridized change-speed transmission 11, in which for the same components the same indexes increased by 10 are used. The transmission 11 in FIG. 3 has only one countershaft VW, which is coupled to the intermediate shaft ZW. The add-on transmission 13 has three gearwheels, a first gearwheel Z1, a second gearwheel Z2 and a third gearwheel Z3, which are arranged in one plane and are in the form of spur gears. A first electric machine EM1 and a second electric machine EM2 are arranged coaxially with one another on either side of the add-on transmission 13, and are connected to the second gearwheel Z2. A compressor 14 is driven by the third gearwheel Z3, which meshes with the second gearwheel Z2. On the intermediate shaft ZW, which extends out of the housing of the change-speed transmission 11 and into the add-on transmission 13, the first gearwheel Z1 is arranged and able to rotate, i.e. it is in the form of a loose wheel—and this loose wheel Z1 can be connected rotationally fixed to the intermediate shaft ZW or the countershaft VW by means of the shifting clutch 17. By virtue of the two electric machines EM1 and EM2 the electric drive power is substantially increased.

Figure 4:
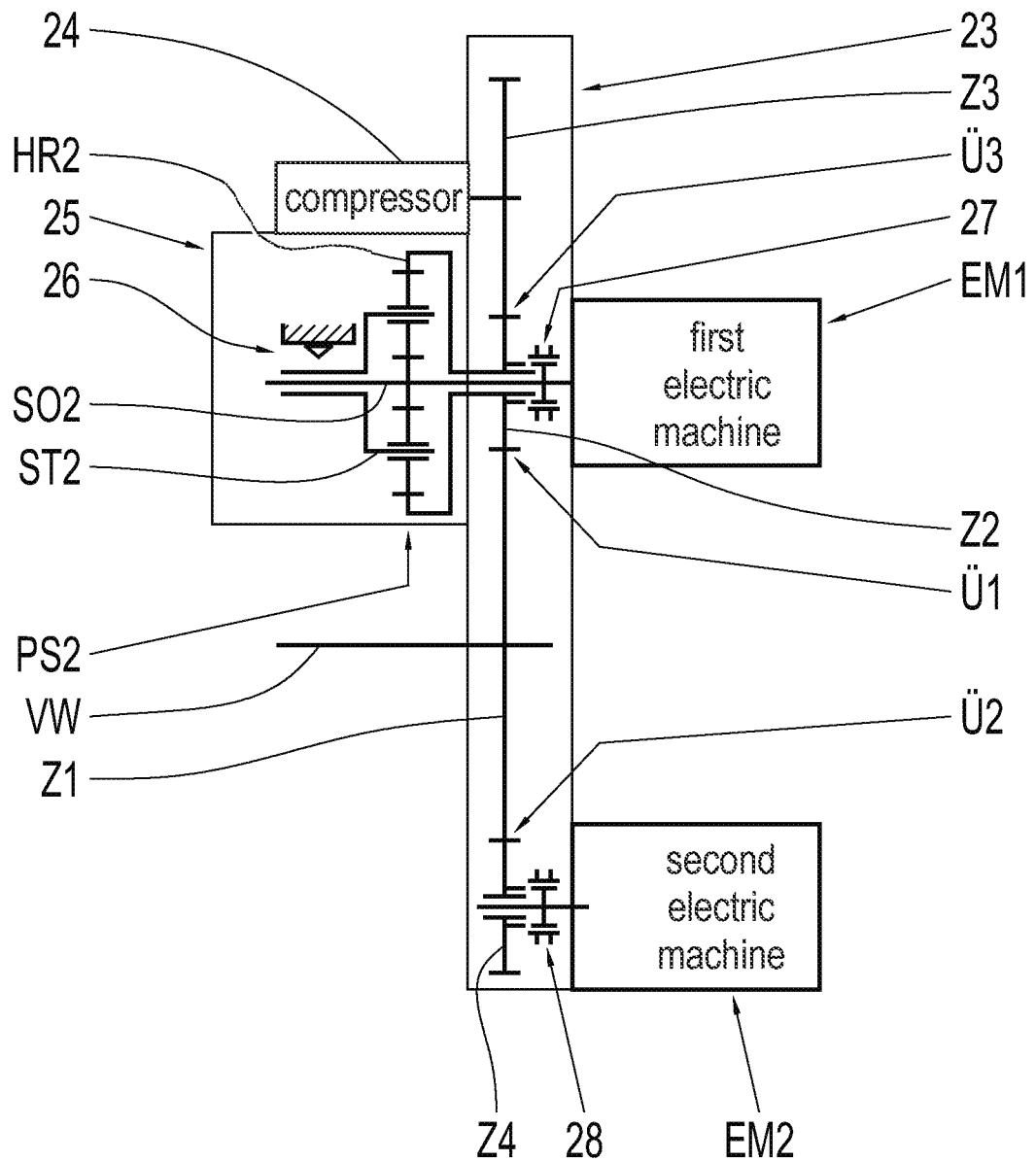
FIG. 4: a further example embodiment of the invention, with two electric machines arranged with parallel axes on the add-on transmission and a further embodiment of the auxiliary transmission.

As a further example embodiment of the invention FIG. 4 shows an add-on transmission 23 with two electric machines EM1 and EM2 arranged with their axes parallel to one another and an auxiliary transmission 25, which comprises a second planetary gearset PS2 with a freewheel 26. In FIG. 4 the change-speed transmission is omitted and instead only the countershaft VW is shown, which is connected rotationally fixed to the first gearwheel Z1. The add-on transmission 23 comprises a total of four gearwheels Z1, Z2, Z3 and Z4 arranged in one plane: a second gearwheel Z2 coaxial with the first electric machine EM1 and a fourth gearwheel Z4 coaxial with the second electric machine EM2, both of them meshing with the first gearwheel Z1 and forming a first gear ratio step Ü1 between the first electric machine EM1 and the countershaft VW and a second gear ratio step Ü2 between the second electric machine EM2 and the countershaft VW. A third gearwheel Z3 is arranged coaxially with the rotational axis of the compressor 24 and, with the second gearwheel Z2, forms a third gear ratio step Ü3. The two electric machines EM1, EM2 are in each case arranged on the rear side of the add-on transmission 23 and each can be engaged by means of a respective shifting clutch 27, 28. The second planetary gearset PS2 arranged coaxially with the first electric machine EM1 has a sun shaft SO2, which can be driven by the rotor shaft of the first electric machine EM1, and a ring gear shaft HR2, which forms the drive output shaft and is connected to the second gearwheel Z2. In the main rotational direction, i.e. during hybrid operation, the carrier shaft ST2 can rotate freely; in the reverse rotation direction the carrier shaft ST2 is blocked by the freewheel 26.

The function of the above-described arrangement with two electric machines EM1 and EM2 is as follows: during hybrid operation the two electric machines EM1 and EM2 can be switched on together or individually, depending on the power demand: for this, the rotor shafts are coupled via the shifting clutches 27, 28 respectively, to the second gearwheel Z2 or the fourth gearwheel Z4. Both gearwheels Z2 and Z4 mesh with the first gearwheel Z1 and therefore drive the countershaft VW.

When the internal combustion engine has been switched off, the first electric machine EM1 can also be used in combination with the auxiliary transmission 25 for restarting the internal combustion engine. In the restarting case the first electric machine EM1 rotates in the reverse direction and drives via the sun shaft SO2 in the second planetary gearset PS2, wherein the carrier shaft ST2 is blocked by the freewheel 26. Thereby, a gear ratio is obtained between the driven sun shaft SO2 and the driving ring gear shaft HR2 in the slow range. Correspondingly, a sufficiently high torque is available at the countershaft VW to restart the internal combustion engine.

The hybrid strategy and the actuation of the electric machines EM1, EM2 and of the shifting clutches 27, 28 are in the hands of the transmission control unit 6 mentioned earlier (FIG. 1). The above-described hybrid module has been shown as an example for subsequent addition to known change-speed transmissions having at least one countershaft. However, it is also possible for the above-described hybrid module according to the invention to be installed on other transmission types which have an intermediate or PTO shaft on the motor side. Furthermore, by appropriate actuation the electric machine EM can assist and speed up the shifting process. Thus, if necessary a transmission brake can be omitted or a synchronization can be replaced by a simple interlocking shifting element. The hybrid module according to the invention also allows auxiliary aggregates to be driven when the internal combustion engine is switched off, which is particularly advantageous for the air-conditioning of a vehicle's cabin.

The electric machines EM, EM1, EM2 are preferably designed for alternating current lower than the low-voltage limit of around 50 volts.

INDEXES

1 Change-speed transmission
2 1a Drive input side
1b Drive output side
2 Drive output flange
3 Add-on transmission
4 Compressor
5 Auxiliary transmission
6 Transmission control device
7 Shifting clutch
11 Change-speed transmission
13 Add-on transmission
14 Compressor
17 Shifting clutch
23 Add-on transmission
24 Compressor
25 Auxiliary transmission
26 Freewheel
27 Shifting clutch (EM1)
28 Shifting clutch (EM2)
EM Electric machine
EM1 First electric machine
EM2 Second electric machine
EW Input shaft
HW Main shaft
HR1 Ring gear shaft (PS1)
HR2 Ring gear shaft (PS2)
PG Planetary transmission
PS1 First planetary gearset
PS2 Second planetary gearset
R1 First wheel plane
R2 Second wheel plane
R3 Third wheel plane
R4 Fourth wheel plane
R5 Fifth wheel plane
SO1 Sun shaft (S1)
SO2 Sun shaft (PS2)
ST1 Carrier shaft (PS1)
ST2 Carrier shaft (PS2)
Ü1 First gear ratio step
Ü2 Second gear ratio step
Ü3 Third gear ratio step
VW Countershaft
VW1 First countershaft
VW2 Second countershaft
Z1 First gearwheel Z2 Second gearwheel
Z3 Third gearwheel
Z4 Fourth gearwheel

The invention claimed is:

1. A transmission arrangement for a hybrid drive of a motor vehicle, the transmission arrangement comprising:
   a change-speed transmission having a drive output side, a drive output flange and a countershaft,
   an add-on transmission being arranged on the change-speed transmission and having two electric machines and at least one gear ratio step, and
   the two electric machines being connected to the countershaft, via the at least one gear ratio step, and can be switched on as an additional electric drive input or drive output,
   the two electric machines are fitted onto the add-on transmission,
   each of the two electric machines has an axis, the two electric machines are arranged such that the axes thereof are parallel to one another and the two electric machines are connected to the countershaft by respective gear ratio steps.

2. The transmission arrangement according to claim 1, wherein the add-on transmission is arranged on the drive output side of the change-speed transmission.

3. The transmission arrangement according to claim 1, wherein the two electric machines are connectable or disconnectable by at least one shifting clutch, which is arranged in a power flow between the two electric machines and the countershaft.

4. The transmission arrangement according to claim 1, further comprising an auxiliary transmission with a first planetary gearset, the first planetary gearset comprising:
   a sun shaft,
   a ring gear shaft, and
   a carrier shaft, and the first planetary gearset is associated with the two electric machines.

5. The transmission arrangement according to claim 4, wherein the first planetary gearset is shiftable such that a first gear is engagable by holding the ring gear shaft thereof still and a second gear is engagable by blocking the sun shaft thereof with the ring gear shaft thereof.

6. The transmission arrangement according to claim 4, wherein the first planetary gearset comprises a freewheel, the sun shaft thereof forms a drive input shaft and the ring gear shaft thereof forms the drive output shaft, and the carrier shaft thereof can be blocked in one rotational direction by the freewheel.

7. The transmission arrangement according to claim 1, wherein an auxiliary aggregate is associated with the add-on transmission and is driveable by way of a further gear ratio step.

8. The transmission arrangement according to claim 7, wherein the auxiliary aggregate is a refrigerant compressor of an air-conditioning unit and the refrigerant compressor is driveable, via the further gear ratio step.

9. The transmission arrangement according to claim 1, wherein the at least one gear ratio step is in a form of a spur gear stage.

10. A transmission arrangement fora hybrid drive of a utility vehicle, the transmission arrangement comprising:
    a group transmission having a drive output side, a drive output flange and a countershaft;
    an add-on transmission being mounted on the group transmission and having at least one electric machine and at least one gear ratio step;
    the at least one electric machine being connected to the countershaft, via the at least one gear ratio step, and the at least one electric machine is activatable as an electric drive input or as a drive output,
    an auxiliary transmission with a first planetary gearset, the first planetary gearset comprising:
    a sun shaft,
    a ring gear shaft, and
    a carrier shaft, and the first planetary gearset is associated with the at least one electric machine.

11. A transmission arrangement for a hybrid drive of a motor vehicle, the transmission arrangement comprising:
    a change-speed transmission having a drive output side, a drive output flange and a countershaft,
    an add-on transmission being arranged on the change-speed transmission and having two electric machines and at least one gear ratio step,
    the two electric machines being connected to the countershaft, via the at least one gear ratio step, and can be switched on as an additional electric drive input or drive output,
    the two electric machines are fitted onto the add-on transmission, and
    the two electric machines are arranged coaxially with one another on opposite sides of the add-on transmission.

12. The transmission arrangement according to claim 11, wherein the add-on transmission is arranged on the drive output side of the change-speed transmission.

13. The transmission arrangement according to claim 11, wherein the two electric machines are connectable or disconnectable by at least one shifting clutch, which is arranged in a power flow between the two electric machines and the countershaft.

* * * * *